United States Patent
Sakamoto

(10) Patent No.: US 8,437,018 B2
(45) Date of Patent: May 7, 2013

(54) IMAGE FORMATION DEVICE SUPPORTING DIRECT PRINTING OF PRINT FILES STORED IN EXTERNAL STORAGE DEVICES

(75) Inventor: Kana Sakamoto, Aichi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1105 days.

(21) Appl. No.: 12/131,469

(22) Filed: Jun. 2, 2008

(65) Prior Publication Data

US 2008/0297845 A1    Dec. 4, 2008

(30) Foreign Application Priority Data

Jun. 4, 2007 (JP) .................. 2007-148135

(51) Int. Cl.
G06K 15/00 (2006.01)
(52) U.S. Cl.
USPC .......... 358/1.14; 358/1.16; 358/444
(58) Field of Classification Search ............ 358/1.1, 358/1.14, 1.16, 1.17, 401, 442, 444, 448, 358/450, 296
See application file for complete search history.

(56) References Cited

U.S. PATENT DOCUMENTS

| | | | | |
|---|---|---|---|---|
| 5,581,377 A | * | 12/1996 | Shimizu et al. | 358/540 |
| 7,538,898 B2 | * | 5/2009 | Fukuda | 358/1.14 |
| 2006/0077424 A1 | * | 4/2006 | Maruta et al. | 358/1.15 |

FOREIGN PATENT DOCUMENTS

| | | |
|---|---|---|
| JP | 09-051420 | 2/1997 |
| JP | 2005-141351 A | 6/2005 |
| JP | 2006-107377 | 4/2006 |
| JP | 2006-295266 | 10/2006 |
| JP | 2007-128238 A | 5/2007 |
| JP | 2005-178070 | 7/2007 |

OTHER PUBLICATIONS

JP Office Action dtd May 12, 2009, JP Appln. 2007-148135.

* cited by examiner

*Primary Examiner* — Thomas D Lee
(74) *Attorney, Agent, or Firm* — Banner & Witcoff, Ltd.

(57) ABSTRACT

There is provided an image formation device, comprising: at least two connection units including a first connection unit and a second connection unit configured such that first and second external storage devices are detachably connectable to the first and second connection units, respectively; a judgment unit configured to make a judgment as to whether user information concerning a user of a file stored in the first external storage device connected to the first connection unit matches user information concerning a user of a file stored in the second external storage device connected to the second connection unit; and a permission unit configured to permit a direct print operation for a file for which the judgment unit judges that the user information of the file stored in the first external storage device matches the user information of the file stored in the second external storage device.

10 Claims, 8 Drawing Sheets

| FIRST EXTERNAL STORAGE DEVICE | | SECOND EXTERNAL STORAGE DEVICE | |
|---|---|---|---|
| LIST 1 | | LIST 2 | |
| File Name | User Name | File Name | User Name |
| aaa.xx | tanaka | aaa.xx | tanaka |
| bbb.xx | tanaka | bbb.xx | suzuki |
| ccc.xx | suzuki | ccc.xx | suzuki |
| ddd.xx | yamada | ddd.xx | yamada |
| eee.xx | ono | fff.xx | oon |
FIG. 3
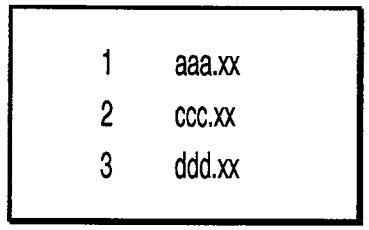
FIG. 4
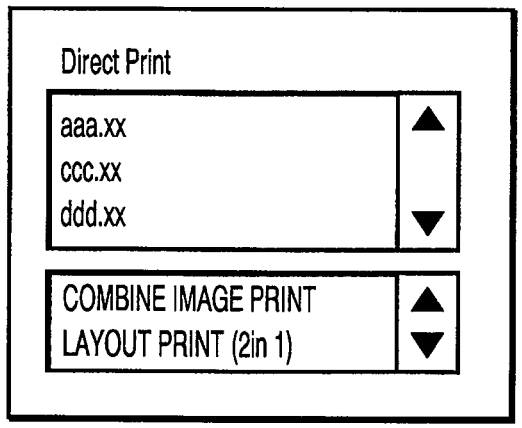
FIG. 5

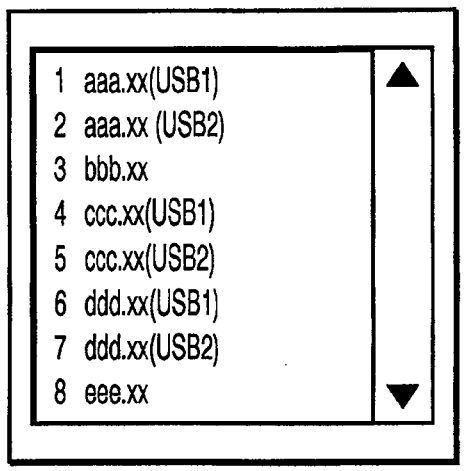
FIG. 8
| FIRST EXTERNAL STORAGE DEVICE || SECOND EXTERNAL STORAGE DEVICE ||
|---|---|---|---|
| LIST 1 || LIST 2 ||
| File Name | User Name | File Name | User Name |
| aaa.xx | tanaka | aaa.xx | tanaka |
| bbb.xx | tanaka | bbb.xx | suzuki |
| ccc.xx | suzuki | ccc.xx | suzuki |
| ddd.xx | yamada | ddd.xx | yamada |
| eee.xx | ono | fff.xx | oon |
FIG. 9
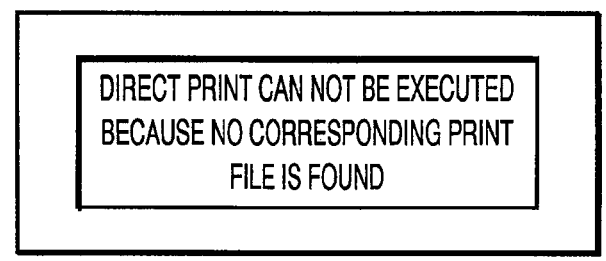
FIG.10

IMAGE FORMATION DEVICE SUPPORTING DIRECT PRINTING OF PRINT FILES STORED IN EXTERNAL STORAGE DEVICES

CROSS-REFERENCE TO RELATED APPLICATION

This application claims priority under 35 U.S.C. §119 from Japanese Patent Application No. 2007-148135, filed on Jun. 4, 2007. The entire subject matter of the application is incorporated herein by reference.

BACKGROUND

1. Technical Field

Aspects of the present invention relate to an image formation device having a direct print function of printing an image corresponding to a file stored in an external storage device attached thereto without the need for control by an external computer.

2. Related Art

Direct print has an advantage in maintaining security because, for direct print, a user operates the image formation device at the immediate area of the image formation device and therefore a possibility that another user looks at printed materials printed by the user becomes low. However, if another user accidentally gets a use's portable storage device and uses the portable storage device, the security of the user can not be maintained.

Japanese Patent Provisional Publication No. 2006-107377 (hereafter, referred to as JP 2006-107377A) discloses an image formation device configured to have a plurality of memory slots to which a plurality of external storage devices can be attached. If users of a plurality of external memory devices attached to the image formation device match each other, the image formation device allows a user operation the image formation device to print data of files stored in the plurality of external storage devices.

SUMMARY

However, the image formation device disclosed in JP 2006-107377A is configured such that printing of files is permitted only when all of users of the external storage devices attached to the image formation device match each other. Therefore, if a plurality of users share a particular external storage device, files of a certain user other than a user of the particular external storage device may be printed regardless of the certain user's intention. Therefore, for users sharing the particular external storage device, adequate security can not be maintained.

Aspects of the present invention are advantageous in that an image formation device capable of enhancing security in a situation in which direct print is performed is provided.

According to an aspect of the invention, there is provided an image formation device, comprising: at least two connection units including a first connection unit and a second connection unit configured such that first and second external storage devices are detachably connectable to the first and second connection units, respectively; a judgment unit configured to make a judgment as to whether user information concerning a user of a file stored in the first external storage device connected to the first connection unit matches user information concerning a user of a file stored in the second external storage device connected to the second connection unit; and a permission unit configured to permit a direct print operation for a file for which the judgment unit judges that the user information of the file stored in the first external storage device matches the user information of the file stored in the second external storage device.

Such a configuration makes it possible to achieve adequate security even if a plurality of print files owned by different users are stored in a single external storage file.

According to another aspect of the invention, there is provided a method for image formation to be implemented on an image formation device having at least first and second connection units to which first and second external storage devices are respectively detachably connectable. The method comprises the steps of: judging whether user information concerning a user of a file stored in a first external storage device connected to the first connection unit matches user information concerning a user of a file stored in the second external storage device connected to the second connection unit; and permitting a direct print operation for a file for which the judgment unit judges that the user information of the file stored in the first external storage device matches the user information of the file stored in the second external storage device.

Such a configuration makes it possible to achieve adequate security even if a plurality of print files owned by different users are stored in a single external storage file.

According to another aspect of the invention, there is provided a computer readable medium having computer readable instruction stored thereon, which, when executed by a processor of an image formation device having at least first and second connection units to which first and second external storage devices are respectively detachably connectable, configures the processor to perform the steps of: judging whether user information concerning a user of a file stored in a first external storage device connected to the first connection unit matches user information concerning a user of a file stored in the second external storage device connected to the second connection unit; and permitting a direct print operation for a file for which it is judged that the user information of the file stored in the first external storage device matches the user information of the file stored in the second external storage device.

Such a configuration makes it possible to achieve adequate security even if a plurality of print files owned by different users are stored in a single external storage file.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 is an example of lists of print files stored in external storage devices attached to the printer.

FIG. 4 is an example of onscreen representation of print files for which direct print is permitted.

FIG. 5 illustrates an example of a screen representing print modes displayed on a display unit of the printer.

FIG. 8 illustrates an example of a screen in which all print files stored in external storage devices are displayed.

FIG. 9 illustrates examples of lists of print files stored in the external storage devices.

FIG. 10 illustrates an example of a warning message displayed on the display unit of the printer.

DETAILED DESCRIPTION

Hereafter, embodiments according to the invention will be described with reference to the accompanying drawings.

First Embodiment

Figure 1:
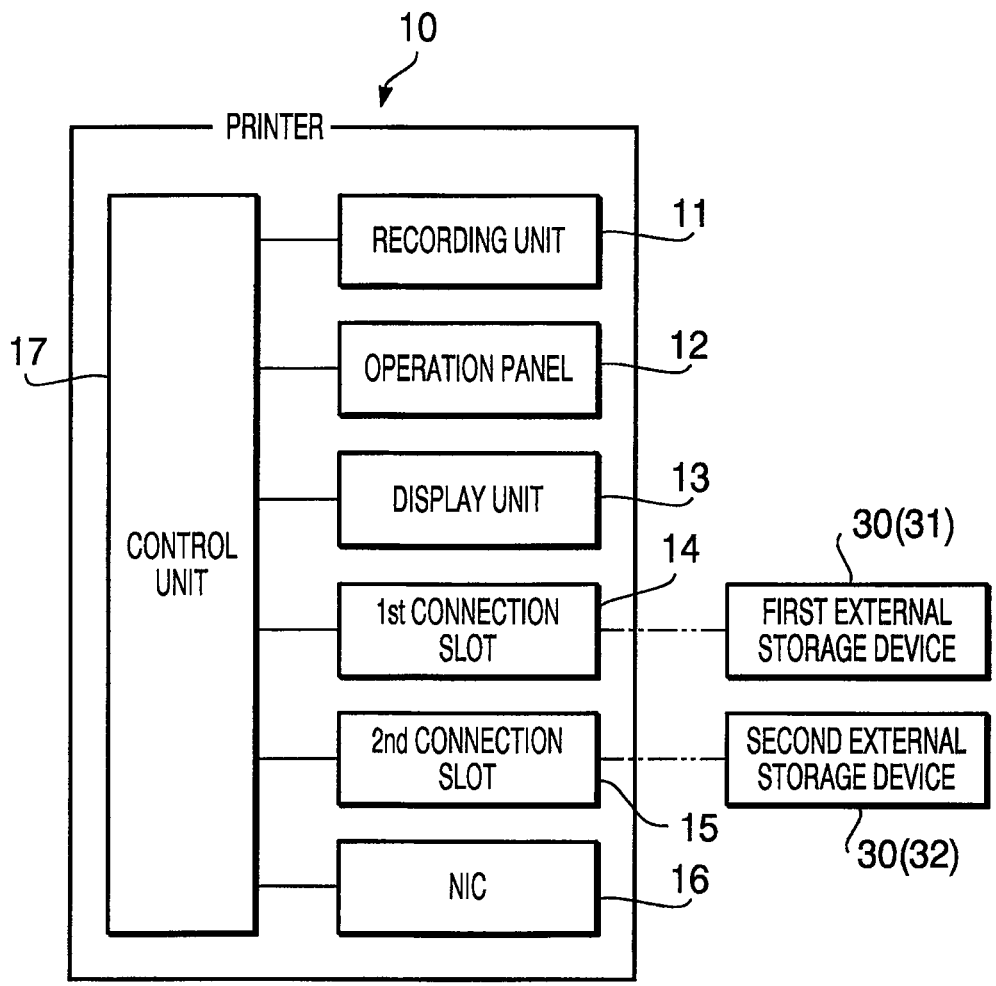
FIG. 1 is a block diagram of a printer according to a first embodiment.
Figure 2:
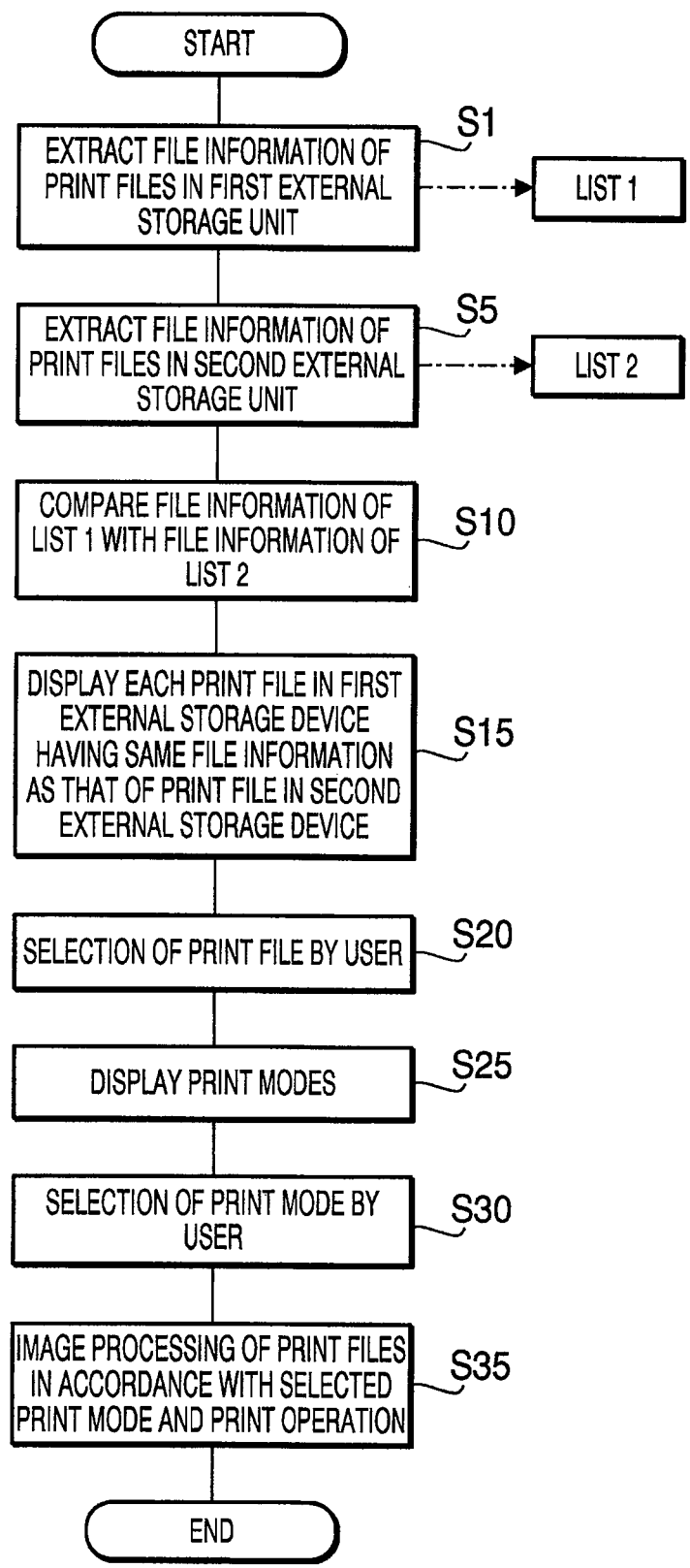
FIG. 2 is a flowchart illustrating a direct print process executed by the printer.

FIG. 1 is a block diagram of a printer (an image formation device) 10 according to a first embodiment. FIG. 2 is a flowchart illustrating a direct print process executed by the printer 10.

As shown in FIG. 1, the printer 10 includes a control unit 17, a recording unit 11 recoding an image on a record medium (e.g., a sheet of paper), an operation panel 12 used by a user, a display unit 13 on which various types of information is displayed, first and second connection slots 14 and 15, and an NIC (Network Interface Card) 16 interfacing the printer 10 with a network. The control unit 17 controls the components 11 to 17 to achieve various functions of the printer 10. The control unit 17 is, for example, a microcomputer chip in which a CPU, a ROM and a RAM are embedded. Various programs including a program for the direct print process are stored in the ROM of the control unit 17.

To the first and second connection slots 14 and 15, first and second external storage devices 31 and 32 can be connected, respectively. In this embodiment, the first and second connection slots 14 and 15 are USB (Universal Serious Bus) interfaces. However, various types of interface slots can be employed as the first and second connection slots 14 and 15. In the following, each of the first and second external storage devices 31 and 32 is generally called an external storage device 30.

Various types of memory devices, such as a USB memory and a SD memory (formed of non-volatile memories), a magnetic storage device (e.g., an HDD), or a device (e.g., a digital camera) supporting a communication standard "PictBridge", can be employed as the external storage device 30 (31, 32).

The direct print means a function of directly printing data of files (e.g., print files) stored in the external storage device 30 without the need of control by an external computer.

Although, in general, the "print file" means a file having a particular format, such as a PDL (Page Description Language) data format, the printer 10 is also able to print data of an image file, such as a BMP (Bit Map) file or a JPEG (Joint Photographic Experts Group) file. Therefore, in the following, the term "print file" is used to indicate a file that the printer 10 is able to print through the direct print.

The print file is added a filename and a user (a creator) of the file as additional information. It is noted that, on a computer on which Windows® runs as an operating system, such additional information (e.g., a filename and user information) can be obtained by referring to a property of a file.

Hereafter, the direct print process executed under control of the control unit 17 of the printer 10 is explained with reference to FIG. 2. The direct print process is started when an operation key for starting the direct print provided on the operation panel 12 is pressed in the condition where the external storage devices 31 and 32 are attached to the first and second connection slots 14 and 15. If both of the first and second connection slots 14 and 15 are not connected with the first and second external storage devices 31 and 32 (e.g., when only one of the first and second connection slots 14 and 15 is connected with one external storage device 30), the printer 10 displays a warning message requesting a user to attach the external storage devices 31 and 32 to both of the first and second connection slots 14 and 15.

When the direct print process is started, file information concerning print files stored in one of the external storage devices 31 and 32 respectively attached to the first and second connection slots 14 and 15 is extracted (step S1). Then, file information concerning print files stored in the other external storage device is extracted (step S5). The file information includes at least a filename of a print file and user information representing a user of the print file. The file information obtained in steps S1 and S5 is stored, for example, in the RAM of the control unit 17 as a list of a plurality of pieces of file information as shown in FIG. 3.

In the following, it is assumed that the external storage device 31 is attached to the first connection slot 14, and the external storage device 32 is attached to the second connection slot 15 for purposes of illustration.

Next, the control unit 17 compares the file information of the print files stored in the external storage device 31 with the file information of the print files stored in the external storage device 32 (step S10). Then, the control unit 17 displays, on the display unit 13, print files each of which is stored in one of the external storage devices 31 and 32 and has the filename and user information equal to the filename and user information of one of print files stored in the other of the external storage devices 31 and 32 (step S15). The print files thus extracted in step S15 are displayed on the display unit 13, for example, as shown in FIG. 4.

When one of the print files displayed on the display unit 13 is selected by the user as a target for the direct print and then the user inputs a print command (step S20), print modes that the printer 10 supports are displayed on the display unit 13 (step S25). FIG. 5 illustrates an example of a screen representing the print modes displayed on the display unit 13.

If one of the print modes is selected by the user (step S30), the print file selected in step S20 (i.e., the print file stored in one of the external storage devices 31 and 32) and the print file which has the same file information as that of the print file selected in step S20 and is stored in the other external storage device are subjected to a printing operation in the selected print mode (step S35). In the following, the print file which as the same file information as that of the print file stored in one of the external storage devices 14 and 15 and is stored in the other external storage device is frequently called a corresponding print file.

That is, in step S35, a print file stored in one of the external storage devices 14 and 15 and a corresponding print file having the same file information stored in the other external storage device are subjected to the selected print mode. For example, in step S35, an image of the print file selected in step S20 (i.e., the print file stored in one of the external storage devices 31 and 32) and an image of the print file which has the same file information as that of the print file selected in step S20 and is stored in the other external storage device are combined, and a combined image is printed through one print job.

The printer 10 supports the following print modes including a combined image print mode, a layout print mode, a both side print mode, a page print mode, and a single file print mode.

Figure 6:
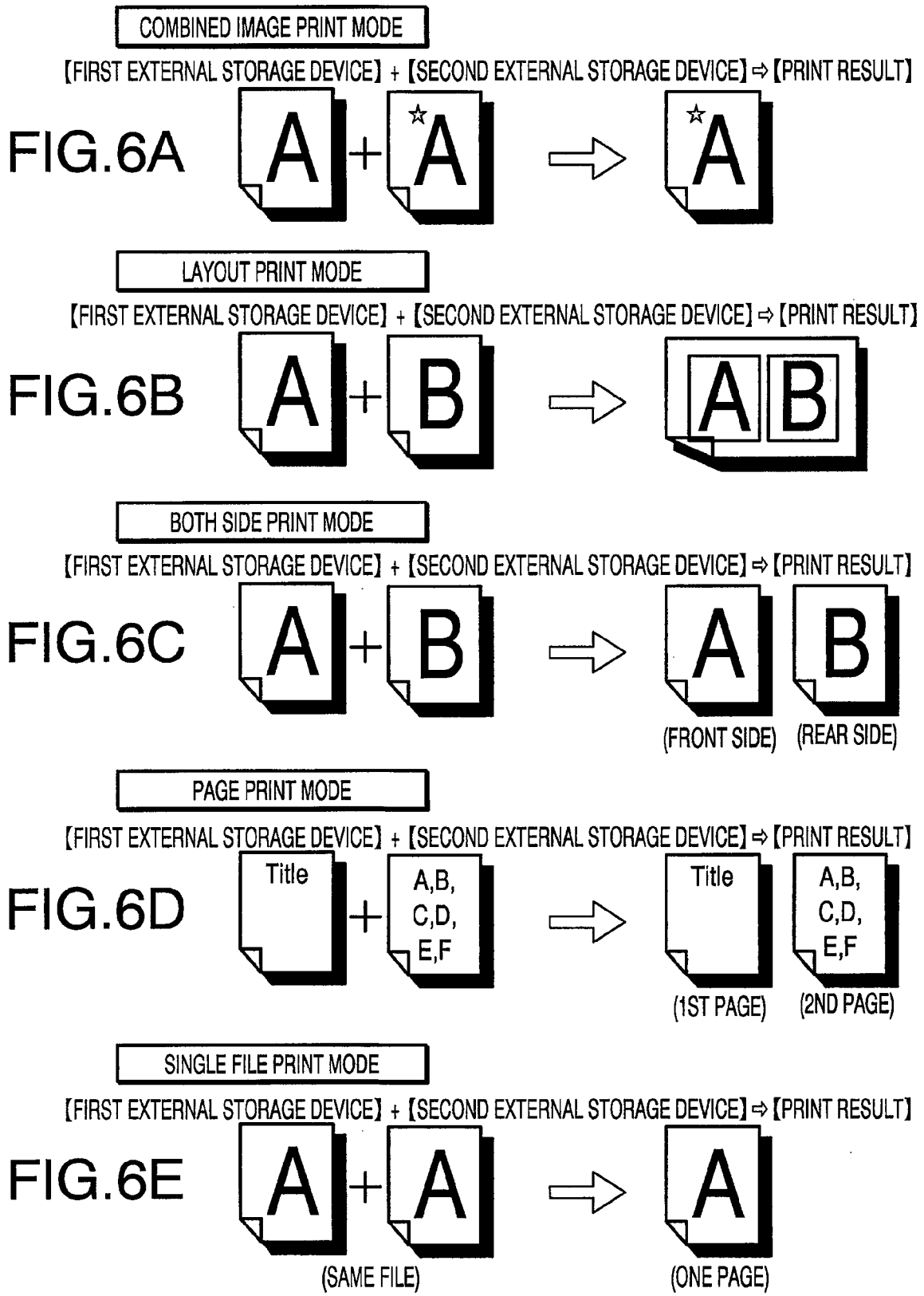
FIGS. 6A-6E are explanatory illustrations for explaining a combined image print mode, a layout print mode, a both side print mode, a page print mode, and a single file print mode, respectively.

FIG. 6A is an explanatory illustration of the combined image print mode. As shown in FIG. 6A, in the combined image print mode, data of the print file stored in the external storage device 31 and data of the corresponding print file stored in the external storage device 32 are combined to form a combined image corresponding to at least a single page is printed. In the combined image print mode, text data in the print files is also reflected in the combined image.

FIG. 6B is an explanatory illustration of the layout print mode. As shown in FIG. 6B, in the layout print mode, images corresponding to a plurality of print files are arranged in a singe page at certain positions.

FIG. 6C is an explanatory illustration of the both side print mode. As shown in FIG. 6C, in the both side print mode, an image of the print file in the external storage device 31 is printed on a front side of a sheet of paper, while an image of the corresponding print file in the external storage device 32 is printed on a rear side of the same sheet of paper. In this case, if the front side of a sheet is defined as an odd page and the rear side of the sheet is defined as an even page, an image of the print file in the external storage device 31 is printed on an odd page, while an image of the corresponding print file in the external storage device 32 is printed on an even page.

FIG. 6D is an explanatory illustration of the page print mode. As shown in FIG. 6D, in the page print mode, a first image of the print file in the external storage device 31 and a second image of the corresponding print file in the external storage device 32 are printed such that the first and second images form a single document.

For example, if the print file in the external storage device 31 contains three pages of data and the corresponding print file in the external storage device 32 contains four pages of data, these print files are printed such that the three pages of data of the print file in the external storage device 31 are printed first, and the first page of the four pages of the corresponding print file in the external storage device 32 is printed subsequent to printing of the last page of the three pages of data of the print file in the external storage device 31.

FIG. 6E is an explanatory illustration of the single file print mode. As shown in FIG. 6E, if data of the print file in the external storage device 31 and data of the corresponding print file in the external storage device 32 are equal to each other, only one of the data of the print file in the external storage device 31 and the data of the corresponding print file in the external storage device 32 is printed. If one of the print file in the external storage device 31 and data of the corresponding print file in the external storage device 32 is empty, data of the print file which is not an empty file is printed.

The printer 10 makes a judgment as to whether to permit printing on a file-by-file basis. The printer 10 permits the direct print if the file information of a print file in the external storage device 31 matches the file information of a print file in the external storage device 32.

Such a configuration makes it possible to achieve adequate security even if a plurality of print files owned by different users are stored in a single external storage file.

Since the printer 10 judges whether user information and a filename of a print file in the external storage device 31 are equal to user information and a filename of a print file in the external storage device 32, it is possible to further enhance the security level.

The combined image print mode is executed such that only one of a print file in the external storage device 31 and a corresponding print file (having the same user information as that of the print file in the external storage device 31) is displayed, and the print file in the external storage device 31 and the corresponding print file in the external storage device 32 are combined when a print command is inputted. Therefore, the user does not need to designate all the print files to be combined to execute the combined image print mode. Consequently, usability concerning execution of the combined image print mode can be enhanced.

If data of a print file in the external storage device 31 and data of a print file in the external storage device 32 are equal to each other, only one of these print files is subjected to the direct print. Therefore, it is possible to prevent the same print data from being wastefully printed.

In this embodiment, only filenames of print files for which the direct print is permitted are displayed, while representation of print files for which the direct print is not permitted is inhibited. Such a configuration makes it possible to prevent the user from erroneously designating, as a target of the direct print, a print file for which the direct print is not permitted.

The printer 10 is configured to allow a user to designate a print mode to be executed so that a complete combined image can be reproduced from a print file in the external storage device 31 and a corresponding print file in the external storage device 32. Since a print result based on a print file in the external storage device 31 and a corresponding print file in the external storage device 32 depends on a print mode designated by the user, only the user who knows the print mode capable of reproducing a complete combined image is able to select a proper print mode.

In this regard, even if a person other than the user who created the print files of the external storage devices 31 and 32 gets the external storage devices 31 and 32 by a fraudulent way, the person is not able to know the proper print mode capable of reproducing the complete combined image. Therefore, the person may not be able to properly reproduce the complete combined image. Therefore, according to the embodiment, the adequate security can be achieved.

Second Embodiment

Hereafter, a printer according to a second embodiment is described. Since the printer according to the second embodiment has the same hardware structure as that of the printer 10 according to the first embodiment, FIG. 1 is also referred to for explanations of the second embodiment. In the following, only the feature of the second embodiment is described.

In the first embodiment, only print files for which the direct print is permitted are displayed on the display unit 13, while print files for which the direct print is not permitted are not displayed on the display unit 13. By contrast, in the second embodiment, all of the files stored in the external storage devices 31 and 32 are displayed on the display unit 13. If a print file for which the direct print is not permitted is selected, the printer 10 according to the second embodiment informs the user of the fact that the direct print can not be executed.

Figure 7:
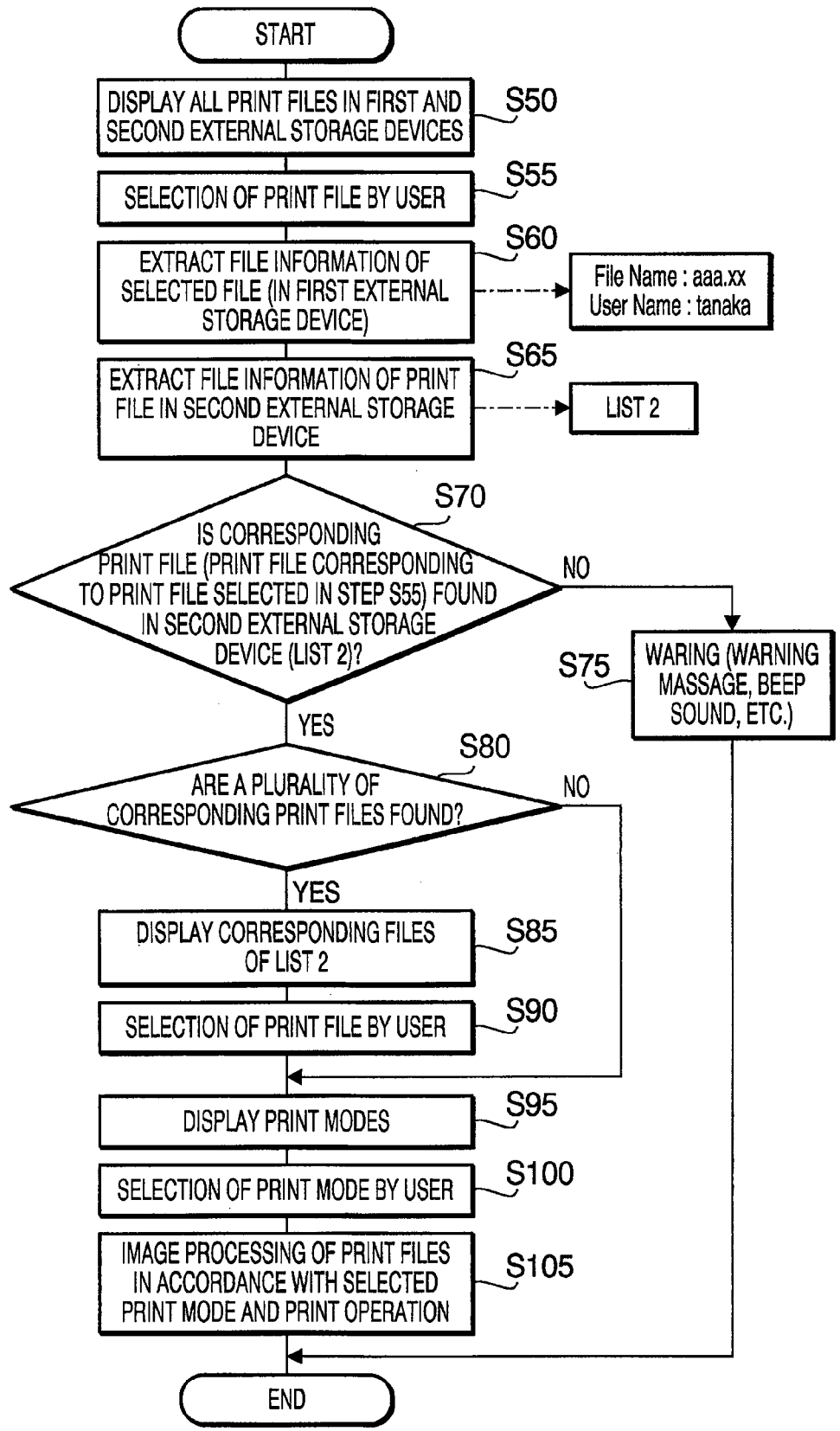
FIG. 7 is a flowchart illustrating a direct print process executed by a printer according to a second embodiment.

FIG. 7 is a flowchart illustrating a direct print process executed under control of the control unit 17 of the printer 10 according to the second embodiment. The direct print process is started when an operation key for starting the direct print provided on the operation panel 12 is pressed in the condition where the external storage devices 31 and 32 are attached to the first and second connection slots 14 and 15. If both of the first and second connection slots 14 and 15 are not connected with the first and second external storage devices 31 and 32 (e.g., when only one of the first and second connection slots 14 and 15 is connected with one external storage device), the printer 10 displays a warning message requesting the user to attach external storage devices 31 and 32 to both of the first and second connection slots 14 and 15. Examples of lists (LIST 1 and LIST 2) of print files stored in the external storage devices 31 and 32 are illustrated in FIG. 9.

When the direct print process is started, all the print files stored in the external storage devices 31 and 32 are displayed on the display unit 13 (step S50). FIG. 8 illustrates an example of a screen in which all the print files stored in the external storage devices 31 and 32 are displayed by step S50. In step S55, the user is allowed to select one of the print files displayed on the display unit 13. If one of the print files stored in one of the external storage devices 31 and 32 is selected by the user, the file information (e.g., user information and a filename) of the selected print file is extracted (step S60), and then the file information of the corresponding print file stored in the other of the external storage devices 31 and 32 is extracted (step S65).

That is, if the selected print file (selected in step S55) is a print file stored in the external storage device 31, the corresponding print file stored in the external storage device 32 is selected in step S65. In the following, it is assumed that a print file stored in the external storage device 31 is selected in step S55.

After the file information of the corresponding print file stored in the external storage device 32 is extracted in step S65, the control unit 17 judges whether the corresponding print file (i.e., a print file corresponding to the print file selected in step S55) is found in the external storage device 32 (step S70).

Figure 11:
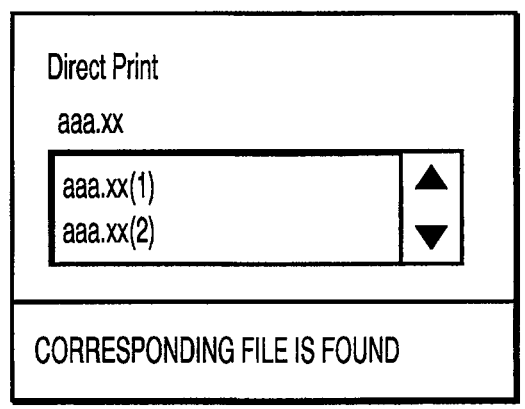
FIG. 11 illustrates an example of a screen in which a plurality of corresponding print files are displayed.

If the corresponding print file is not stored in the external storage device 32 (S70: NO), the direct print of the selected print file can not be executed, and therefore the control unit 17 displays a warning message indicating that the direct print can not be executed (step S75). FIG. 10 illustrates an example of the warning message displayed in step S75. In step S75, a different type of warning (e.g., a beeping sound) may be provided for the user If the corresponding print file is stored in the external storage device 32 (S70: YES), control proceeds to step S80 where the control unit 17 judges whether a plurality of corresponding files are stored in the external storage device 32. If a plurality of corresponding print files are stored in the external storage device 32 (S80: YES), the control unit 17 displays the plurality of corresponding files on the display unit 13 so as to allow the user to select one of the plurality of found print files as shown in FIG. 11 (step S85). In step S90, the user is allowed to select one of the print files displayed on the display unit 13. After step S90 is processed or it is judged in step S80 that the plurality of corresponding print files are not found (S80: NO), control proceeds to step S95.

In step S95, the control unit 17 displays the print modes which the printer 10 supports on the display unit 13 so as to allow the user to select one of the print modes (S95, S100). After one of the print modes is selected by the user, the print file selected in step S55 and the corresponding file selected in step S90 are printed in the selected print mode (step S105).

In this embodiment, although all of the print files stored in the external storage devices 31 and 32 are displayed regardless of whether the direct print is permitted for each print file, the printer 10 displays a warning message indicating that the direct print is not permitted if a print file for which the direct print is not permitted is designated by the user. Therefore, the user is able to know that the selected print file can not be subjected to the direct print even when the user erroneously selects an improper print file.

Third Embodiment

Hereafter, a printer according to a third embodiment is described. Since the printer according to the third embodiment has the same hardware structure as that of the printer 10 according to the first embodiment, FIG. 1 is also referred to for explanations of the third embodiment. In the following, only the feature of the third embodiment is described.

In the second embodiment, all of the print files stored in the external storage devices 31 and 32 are displayed when the operation key for starting the direct print is pressed by the user (see S50 of FIG. 7). By contrast, in the third embodiment, print files stored in only one of the external storage device 31 and 32 are displayed on the display unit 13.

Figure 12:
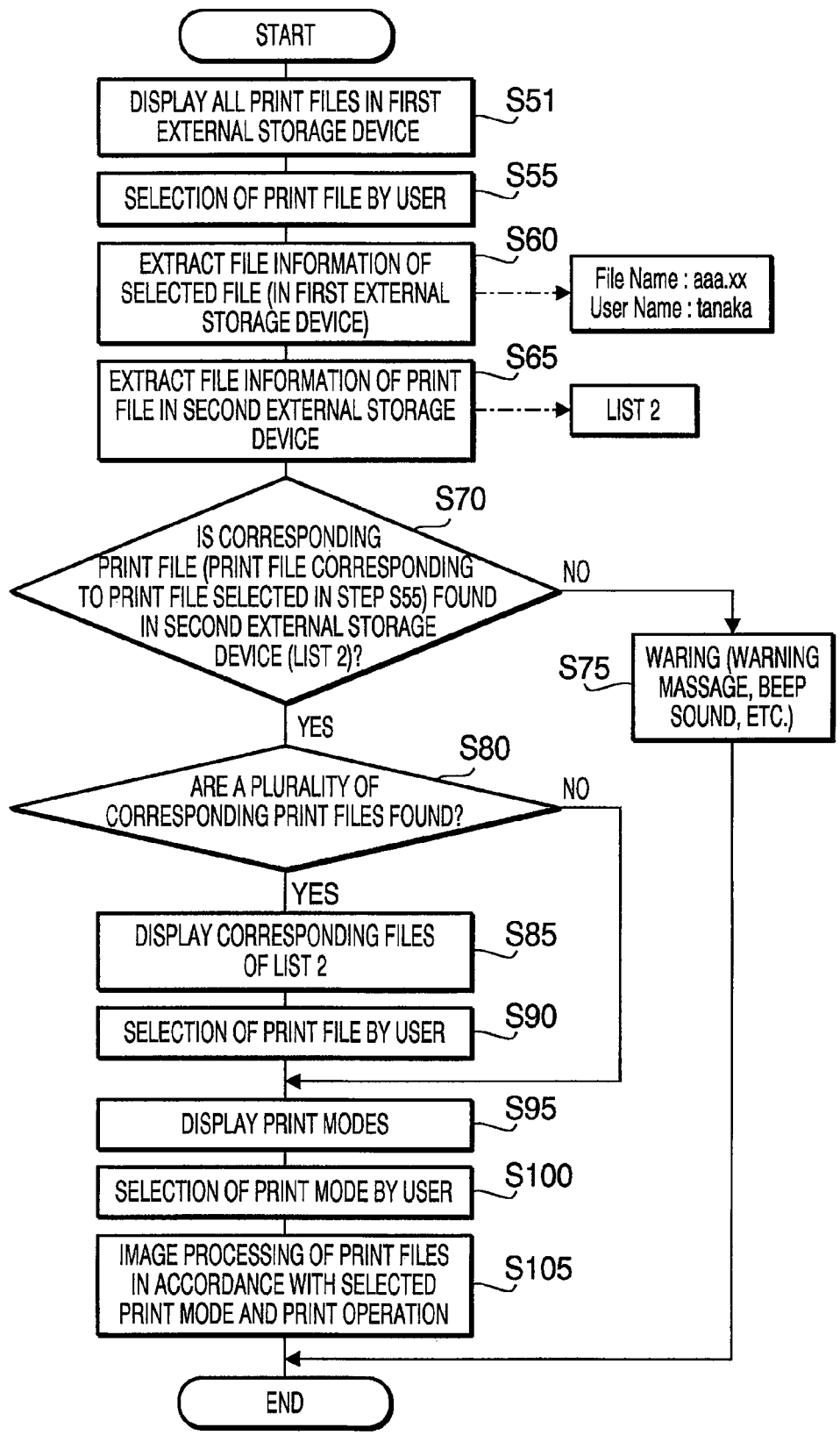
FIG. 12 is a flowchart illustrating a direct print process executed by a printer according to a third embodiment.

FIG. 12 is a flowchart illustrating a direct print process executed under control of the control unit 17 of the printer 10 according to the third embodiment. Since the direct print process shown in FIG. 12 is substantially the same as that of the direct print process shown in FIG. 7 excepting the displaying step S50, in the following only the feature of the third embodiment is explained. In FIG. 21, to steps which are substantially the same as those shown in FIG. 7, the same step numbers are assigned and explanations thereof will not be repeated.

When the operation key for starting the direct print is pressed by the user, the control unit 17 displays print files stored in one of the external storage devices 31 and 32 on the display unit 13. Then, the user is allowed to select one of the print files displayed on the display unit 13 (step S55).

In this embodiment, print files stored in only one of the external storage devices 31 and 32 are displayed, and therefore the user is not allowed to select a print file stored in the other of the external storage devices 31 and 32. However, if a print file for which the direct print is not permitted is selected by the user, the printer 10 inhibits execution of the direct print for the selected print file and displays the warning message as in the case of the second embodiment. Therefore, substantially the same advantage of the second embodiment can also be achieved by the printer 10 according to the third embodiment.

Although the present invention has been described in considerable detail with reference to certain preferred embodiments thereof, other embodiments are possible.

In the first embodiment, if a print file stored in one of the external storage devices 31 and 32 does not have a corresponding print file in the other external storage file, execution of the direct print for such print files are inhibited by not displaying such print files on the displaying unit 13. However, various types of ways of inhibiting execution of the direct print for such improper print files can be employed. For example, filenames of such print files for which the direct print should be inhibited may be displayed while adding information indicating that the direct print is not permitted to each of these print files.

If both of the external storage devices 31 and 32 have storing regions having the same identification (e.g., folders or directories having the same name), execution of the direct print for print files stored in each of such storing regions having the same identification may be permitted.

More specifically, if both of the external storage devices 31 and 32 have the same folders "tanaka", the printer 10 may judge that the user information of print files in the directory "tanaka" of the external storage device 31 and the user information of print files in the directory "tanaka" of the external storage device 32 match each other.

In the above mentioned embodiment, the printer 10 permits the direct print if both of the user information and a filename of a print file in one of the external storage devices 31 and 32 match the user information and a filename of a print file in the other external storage device. However, the printer 10 may permit the direct print if at least one of the user information and a filename of a print file in one of the external storage devices 31 and 32 matches corresponding one of the user information and a filename of a print file in the other external storage device.

In the above mentioned embodiments, the user information and a filename are used as the file information. However, various types of information can be employed as the file information. It is noted that identification data contained in a data part of a print file may be used as the file information. For example, property information, such as, header information, a category, a creator of a file, a keyword, and comments may be used as the file information.

The user information is not limited to a user (or a creator) of a print file. For example, a name indicating a user group (e.g., a name of a department) may be used as the user information.

In addition to judging that filenames of print files match each other in response to the fact that filenames of print files are completely equal to each other, the printer 10 may judge that filenames of print files match each other in response to the fact that filenames of the print files are partly equal to each other or the fact that extensions of the print files are equal to each other. For example, if a partial match mode (in which the printer 10 judges that filenames of print files match each other in response to the fact that filenames of the print files are partly equal to each other) is used in the comparison between filenames of print files, the printer 10 may judge that a filename "Guidance on Patent Application.xxx" and a filename "Filing of Patent Application.xxx" match each other.

In the above mentioned embodiment, the printer 10 is configured to have two connection slots. It is understood that the mage formation device may have more than two connection slots. If the image formation device has more than two connection slots, the image formation device may permit execution of the direct print if print files respectively stored in the more than two connection slots have the same file information. For example, assuming that the printer 10 has three connection slots to which first to third external storage devices are connected, if a print file A stored in a first external storage, a print file B stored in a second external storage device and a print file C stored in a third external storage device have the same file information, the image formation device may permit execution of the direct print for the print files A, B and C.

What is claimed is:

1. An image formation device, comprising:
at least two connection units including a first connection unit and a second connection unit configured such that first and second external storage devices are detachably connectable to the first and second connection units, respectively;
a processing unit; and
memory that stores computer-executable instructions that, when executed by the processing unit, cause the processing unit to function as:
a judgment unit configured to make a judgment as to whether user information concerning a user of a file stored in the first external storage device connected to the first connection unit matches user information concerning a user of a file stored in the second external storage device connected to the second connection unit; and
a permission unit configured to permit a direct print operation for a file for which the judgment unit judges that the user information of the file stored in the first external storage device matches the user information of the file stored in the second external storage device,
wherein each file stored in the first external storage device and the second external storage device is associated with a particular user.

2. The image information device according to claim 1, wherein:
the judgment unit further makes a judgment as to whether a filename of the file stored in the first external storage device connected to the first connection unit matches a filename of the file stored in the second external storage device connected to the second connection unit; and
the permission unit permits the direct print operation for a file for which the judgment unit judges that the user information and the filename of the file stored in the first external storage device matches the user information and the filename of the file stored in the second external storage device.

3. The image information device according to claim 1, wherein the judgment unit judges that the user information of a first file stored in the first external storage device matches the user information of a second file stored in the second external storage device if identification information of a first storing region which is formed in the first external storage device and contains the first file matches identification information of a second storing region which is formed in the second external storage device and contains the second file.

4. The image information device according to claim 1, wherein the memory further stores computer-executable instructions that, when executed by the processing unit, cause the processing unit to function as:
a display control unit configured to display at least one file for which the judgment unit judges that the user information of the file stored in the first external storage device matches the user information of the file stored in the second external storage device; and
an image combining unit configured to form combined print data by combining data of a file which is displayed by the display unit and for which a print command is inputted and data of a corresponding file having matched user information in the second external storage device, and to print the combined print data.

5. The image information device according to claim 1, wherein the memory further stores computer-executable instructions that, when executed by the processing unit, cause the processing unit to function as:
a display control unit configured to display at least one file for which the judgment unit judges that the user information of the file stored in the first external storage device matches the user information of the file stored in the second external storage device; and
a print control unit configured such that if first data of a file which is displayed by the display control unit and for which a print command is inputted and second data of a corresponding file having matched user information in the second external storage device are equal to each other, the print control unit prints only one of the first data and the second data.

6. The image information device according to claim 1, wherein the memory further stores computer-executable instructions that, when executed by the processing unit, cause the processing unit to function as:

a display control unit configured to display a file for which the direct print operation is permitted by the permission unit and not to display a file for which the direct print operation is not permitted by the permission unit.

7. The image information device according to claim 1, wherein the memory further stores computer-executable instructions that, when executed by the processing unit, cause the processing unit to function as:

a display control unit configured to display files stored in the first and second external storage devices; and a notification unit configured such that if a print command is inputted by a user for a file which is displayed by the display control unit but for which the direct print operation is not permitted by the permission unit, the notification unit notifies the user that the direct print operation cannot be executed.

8. The image information device according to claim 1, wherein the memory further stores computer-executable instructions that, when executed by the processing unit, cause the processing unit to function as:

a display control unit configured to display files stored in one of the first and second external storage devices; and a notification unit configured such that if a print command is inputted by a user for a file which is displayed by the display control unit but for which the direct print operation is not permitted by the permission unit, the notification unit notifies the user that the direct print operation cannot be executed.

9. A method for image formation to be implemented on an image formation device having at least first and second connection units to which first and second external storage devices are respectively detachably connectable, comprising the steps of:

judging whether user information concerning a user of a file stored in the first external storage device connected to the first connection unit matches user information concerning a user of a file stored in the second external storage device connected to the second connection unit; and permitting a direct print operation for a file for which it is judged in the judging step that the user information of the file stored in the first external storage device matches the user information of the file stored in the second external storage device, wherein each file stored in the first external storage device and the second external storage device is associated with a particular user.

10. A non-transitory computer readable medium having computer readable instructions stored thereon, which, when executed by a processor of an image formation device having at least first and second connection units to which first and second external storage devices are respectively detachably connectable, causes the processor to perform the steps of:

judging whether user information concerning a user of a file stored in the first external storage device connected to the first connection unit matches user information concerning a user of a file stored in the second external storage device connected to the second connection unit; and permitting a direct print operation for a file for which it is judged in the judging step that the user information of the file stored in the first external storage device matches the user information of the file stored in the second external storage device, wherein each file stored in the first external storage device and the second external storage device is associated with a particular user.

\* \* \* \* \*